United States Patent
Hoffman et al.

(10) Patent No.: US 7,668,213 B2
(45) Date of Patent: Feb. 23, 2010

(54) METHOD AND APPARATUS FOR OBTAINING AND MAINTAINING MODE-LOCKING IN FIBER LASER SYSTEMS

(75) Inventors: Robert Hoffman, Clinton, MI (US); Salvatore F. Nati, Jr., Dexter, MI (US); Xinhua Gu, Ann Arbor, MI (US); Zhenlin Liu, Ann Arbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 1001 days.

(21) Appl. No.: 11/024,948

(22) Filed: Dec. 30, 2004

(65) Prior Publication Data
US 2006/0146892 A1  Jul. 6, 2006

(51) Int. Cl.
*H01S 3/098* (2006.01)
(52) U.S. Cl. ................................ 372/18; 372/29.015
(58) Field of Classification Search .......... 372/20, 372/6, 34, 38.02, 29.011, 18, 21; 398/5
See application file for complete search history.

(56) References Cited

U.S. PATENT DOCUMENTS

| | | | | |
|---|---|---|---|---|
| 4,866,712 A | * | 9/1989 | Chao | 714/704 |
| 6,738,408 B2 | * | 5/2004 | Abedin | 372/94 |
| 6,850,543 B2 | * | 2/2005 | Cundiff et al. | 372/18 |
| 6,957,019 B2 | * | 10/2005 | Gupta et al. | 398/95 |
| 2002/0176452 A1 | * | 11/2002 | Lin et al. | 372/18 |

* cited by examiner

*Primary Examiner*—Minsun Harvey
*Assistant Examiner*—Tuan N. Nguyen
(74) *Attorney, Agent, or Firm*—Sughrue Mion, PLLC

(57) ABSTRACT

A method and apparatus for detecting and controlling the conditions needed for starting and maintaining mode-locked operation of a laser system including a fiber oscillator and high power fiber amplifier. The invention is used to monitor the output power and repetition rate of the fiber oscillator and control the operation of the oscillator such that the oscillator obtains and maintains correct mode-locked operation despite changes in environmental conditions such as temperature, and also with changes due to component aging or degradation.

21 Claims, 5 Drawing Sheets

METHOD AND APPARATUS FOR OBTAINING AND MAINTAINING MODE-LOCKING IN FIBER LASER SYSTEMS

FIELD OF THE INVENTION

This invention relates to a pulsed laser system comprising a fiber oscillator seed source and a high power fiber or solid state amplifier, and to control systems for maintaining mode-locked operation of such laser systems.

BACKGROUND OF THE INVENTION

Pulsed laser systems including a passively mode-locked fiber oscillator and high power fiber amplifier have been developed and are well known. In such systems, the oscillator is typically started and run at a fixed pump diode current or power based on the design of the oscillator optical cavity parameters. These oscillator cavity parameters can change with temperature or over time with variations in component parameters such as pump diode coupling efficiency. These changes can prevent the oscillator from becoming mode-locked at startup or to lose mode-locking after a successful startup. In U.S. application Ser. No. 10/813,173 of the same assignee, "Method and Apparatus for Controlling and Protecting Pulsed High Power Fiber Amplifier Systems", incorporated by reference herein, a control system is provided to turn off the laser to prevent damage to the system in such an event.

In U.S. Pat. No. 6,693,927 to Horvath et al., a control system is described for reinitiating mode-locking when mode-locking is lost. First, an operator predetermines a base pump diode current for maintaining mode-locking in the oscillator where the gain medium is composed of a solid-state lasing material such as Nd:glass in a bulk optics cavity. If mode-locking is lost, the current is increased by a fixed percentage to overdrive the oscillator. Once mode-locking has been obtained, the current is reduced back to the base current value. The mode-locking condition of the oscillator is periodically monitored and if mode-locking is lost, the current is again increased to the fixed overdrive value in an attempt to obtain mode-locking.

In a fiber oscillator, the Horvath method will not guarantee mode-locking due to the fact that conditions such as a temperature change of the gain fiber, pump diode coupling efficiency, or saturable absorber reflectivity may require that the pump diode current be either increased or decreased. The required amount of the increase or decrease is not necessarily a fixed percentage and will change over time and environmental conditions. An overdrive circuit such as described by Horvath thus has little value since increasing the current by a fixed amount will not help reestablish the mode-locking condition. Horvath's method can also be deleterious since it may result in double pulsing or damage if the cavity power is too high. Similarly, it may be that increasing the current by a fixed percentage will not result in a sufficient pump diode power to obtain mode-locking.

Thus it is required in a fiber laser to actively monitor not only the oscillator mode-locking, but also to measure the repetition rate and output power. In a fiber oscillator it is preferable to adjust the pump diode current to keep the oscillator output power constant. The level of control needed is dependent on the design of the mode-locked fiber laser. In U.S. Pat. No. 5,627,848 "Apparatus For Producing Femtosecond And Picosecond Pulses From Mode-Locked Fiber Lasers Cladding Pumped With Broad Area Diode Laser Arrays, one design requires a current range of +/−1% stability and another design a current range of +/−10%. In U.S. Pat. No. 5,689,519, "Environmentally Stable Passively Mode-locked Fiber Laser Pulse Source" a design which requires a current stability of +/−7% is described. It is not just the small range of current stability that is the issue. It is the long term drift of the stability range either up or down.

In a fiber oscillator, it is also desirable to be able to control and vary the temperature of the pump diode such that the wavelength of the pump diode is at the optimum wavelength for absorption by the gain fiber. The temperature of the pump diode may be increased or decreased to obtain the desired wavelength. The present invention provides a means and method for detecting and controlling the conditions needed to obtain and maintain mode-locking of a fiber oscillator.

SUMMARY OF THE INVENTION

It is an object of the invention to provide a method of obtaining mode-locking of a fiber oscillator over changes in environmental conditions such as temperature, or changes in component parameters such as pump diode coupling efficiency.

It is an object of the invention to provide a system for measuring the output power and repetition rate of a fiber oscillator to determine if the fiber oscillator is properly mode-locked.

It is an object of the invention to provide a mechanism for varying the current of the oscillator pump diode to obtain a proper mode-locking condition.

It is also an object of the invention to provide a mechanism for varying the current of the oscillator pump diode such that the output power of the oscillator is held at a constant value, thus maintaining a proper mode-locked condition.

It is a further object of the invention to provide a system for measuring and controlling the temperature of the fiber oscillator pump diode such that the pump diode temperature and wavelength are maintained at an optimum value with changes in diode current or ambient temperature.

It is a still further object of the invention to provide a device for storing a desired pump diode current setting, as a function of module temperature, such that the oscillator can obtain mode-locking as the module temperature varies.

It is an object of the invention to provide an apparatus for calculating the changes needed in oscillator pump diode current and temperature to obtain mode-locking, and storing those current values in non-volatile memory such that they can be used to obtain oscillator mode-locking with changes in device parameters.

DETAILED DESCRIPTION OF THE PREFERRED EMBODIMENT

Figure 1:
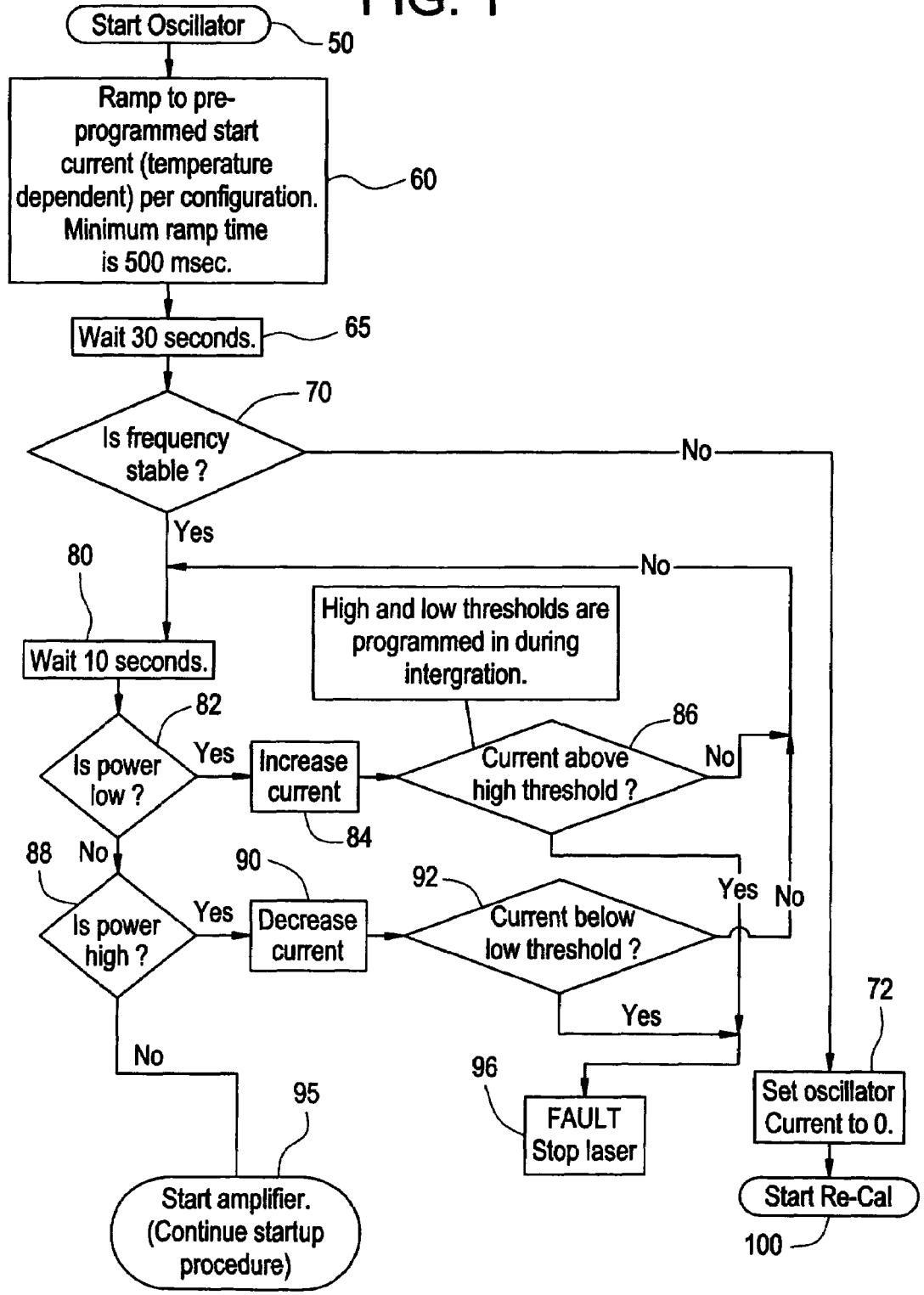
FIG. 1 is a flow chart of a mode-locking process for a fiber oscillator.
Figure 2:
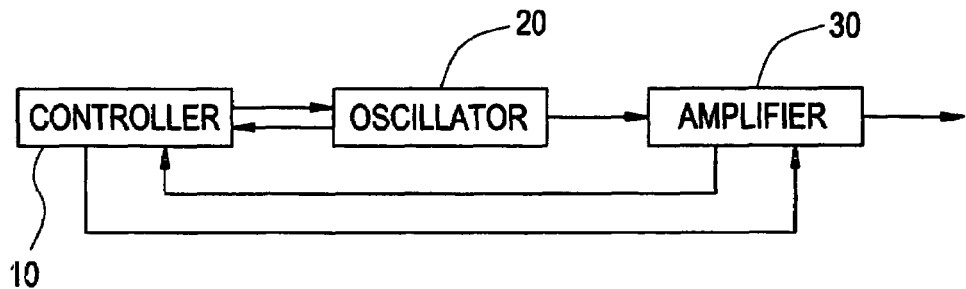
FIG. 2 is a block diagram of the invention.

A block diagram of the invention is shown in FIG. 2. It includes an oscillator 20, an amplifier 30 and a controller 10. A flow chart of the method used to obtain mode-locking is shown in FIG. 1.

Figure 2A:
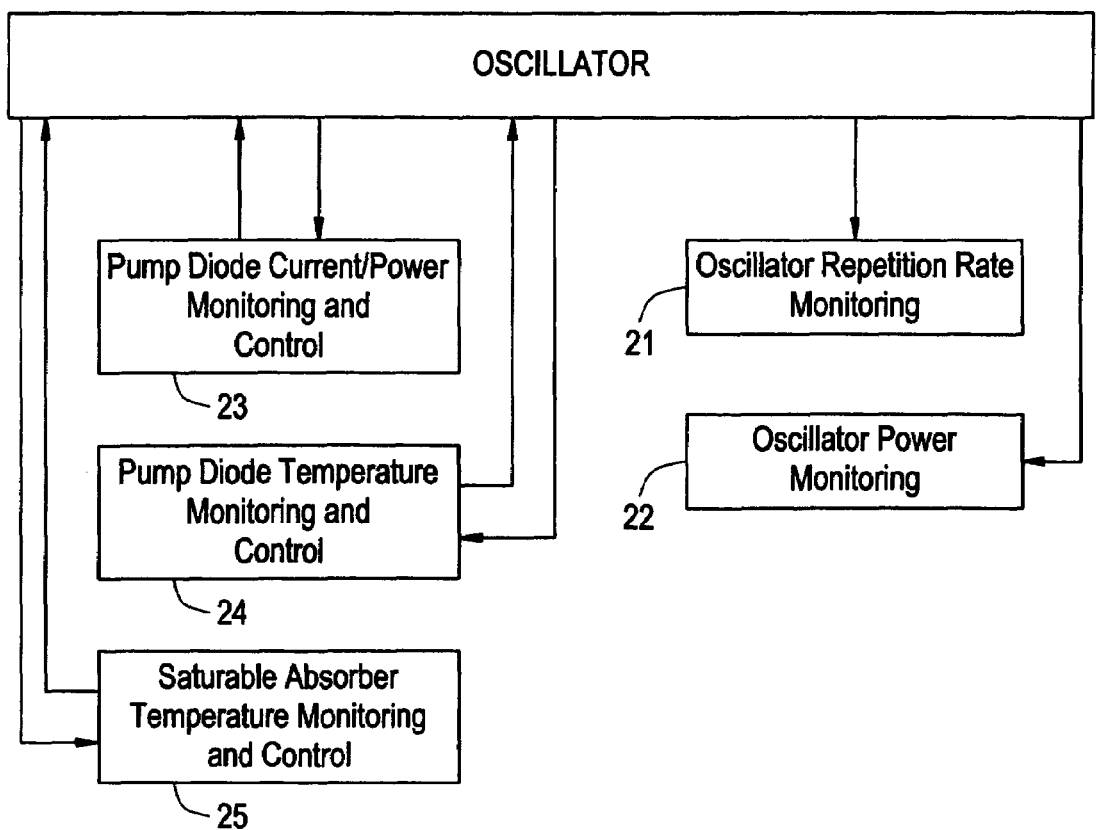
FIG. 2a shows the control elements of the oscillator of FIG. 2.
Figure 2B:
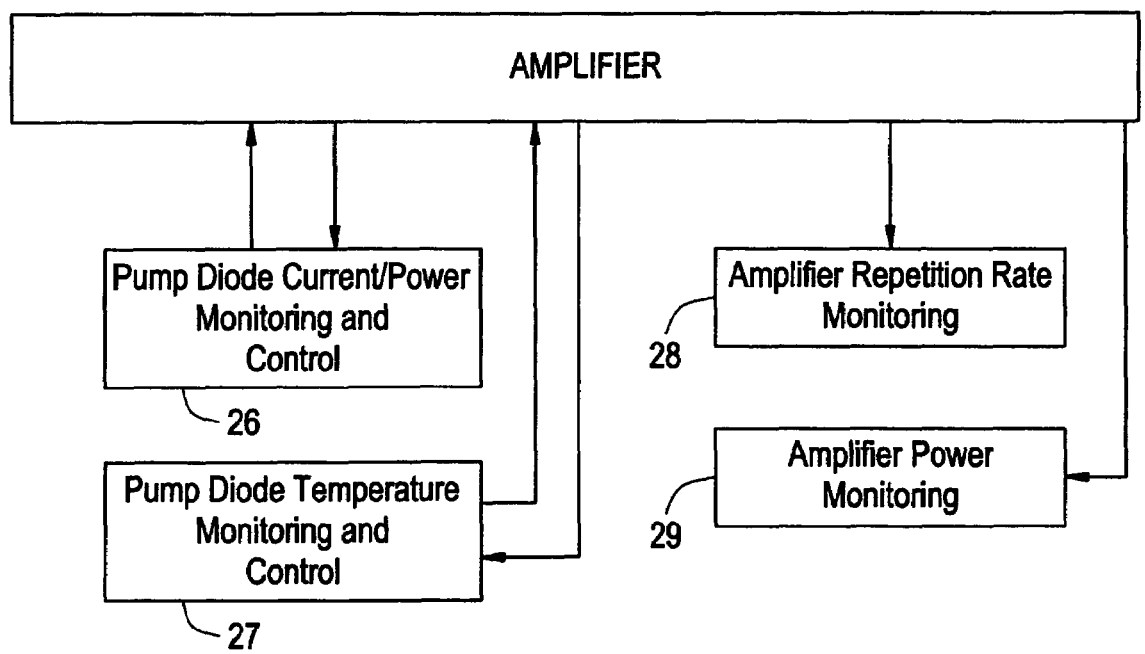
FIG. 2b shows the control elements of the amplifier of FIG. 2.

The controller has the ability to control and monitor various parameters of both the oscillator and amplifier. As shown in FIG. 2a, the oscillator includes a number of monitoring and control elements which can be used to determine and control its operating parameters. Included here are an oscillator repetition rate monitoring device 21, an output power monitor 22, a pump diode current and power monitor and controller 23, a pump diode temperature monitor and controller 24 and a saturable absorber temperature monitor and controller 25. As shown in FIG. 2b, the amplifier includes similar monitoring and control elements, including pump diode current and power monitor and controller 26, pump diode temperature monitor and controller 27, amplifier repetition rate monitor 28 and amplifier power monitor 29. In addition, temperature sensors (not shown) may be located in the oscillator and amplifier to detect the oscillator and amplifier temperatures per se. The controller 10 can thus monitor and/or control the laser using these detectors and control elements.

The current and temperature of both the oscillator pump diode and the amplifier pump diode can thus be monitored and controlled. The temperature of the saturable absorber can be monitored and controlled to keep its reflectivity constant with wavelength over a large temperature range, to allow the laser to be operated reliably over a range of approximately 10-40 degrees C. The temperature, power and repetition rate of both the oscillator and amplifier are monitored as indicated.

For example, when the oscillator is started, the pump diode current is ramped up to a preprogrammed temperature dependent start current, and the controller monitors the repetition rate of the oscillator. In one embodiment, this is done by using a photodiode and amplifier to convert the optical signal into an electrical pulse train. The repetition rate of this pulse train is the calculated by the controller. If this rate is stable and substantially equal to a preset value, such as the nominal oscillator repetition rate, and the repetition rate varies by less than a predetermined amount, the oscillator is considered mode-locked. There are conditions which will cause the oscillator to have a repetition rate that is not nominal. For example, the oscillator may be double pulsing due to high intracavity power or the repetition rate may be non-uniform if the oscillator is Q-switching. These are undesirable conditions and the invention can detect and prevent these conditions. The allowable variation from the nominal repetition rate can be adjusted to allow for small changes due to changes in cavity length variation, and this allowable variation is stored in the controller for comparison to the actual repetition rate.

Specifically, the algorithm for obtaining mode-locking is shown in detail in the flow chart of FIG. 1. In one particular embodiment, at oscillator start 50, the initial start current for the oscillator pump diode is stored in a table in the controller. This initial current is a function of the oscillator temperature and is determined during system integration and stored in the controller memory. The temperature of the oscillator is measured at startup and the initial oscillator pump diode current is set accordingly at 60 by ramping up to the preset, temperature dependent value. The controller then measures the repetition rate of the oscillator several times over a period of approximately 30 seconds at 65 to determine if it is stable and within a predetermined range at step 70. This is done to avoid false alarms from the normal Q-switching that occurs during the first several hundred microseconds of startup in a fiber oscillator, as shown in FIG. 9 of U.S. Pat. No. 6,252,892 B1 to Jiang et al. If the frequency is stable and within range, the output power of the oscillator is measured at 82, 84 after a short wait 80. This power is compared to a predetermined reference value and the oscillator pump current is increased at 84 if the power is lower than the reference value, and decreased at 90 if the power is higher than the reference value. The amount of the increase or decrease is variable and is a function of the difference between the actual power and the reference power. This allows the oscillator power to quickly converge to the reference value.

When the laser power reaches the reference power level, normal oscillator startup has occurred and the controller will start the amplifier.

Upper and lower limits of the pump current adjustment are also preset. These values are set to prevent damage to the system. If the current reaches either the upper or lower limit without the oscillator output converging to the reference power value, the laser is stopped and a fault is indicated to the user, as shown in steps 86, 92 and 96.

Figure 3:
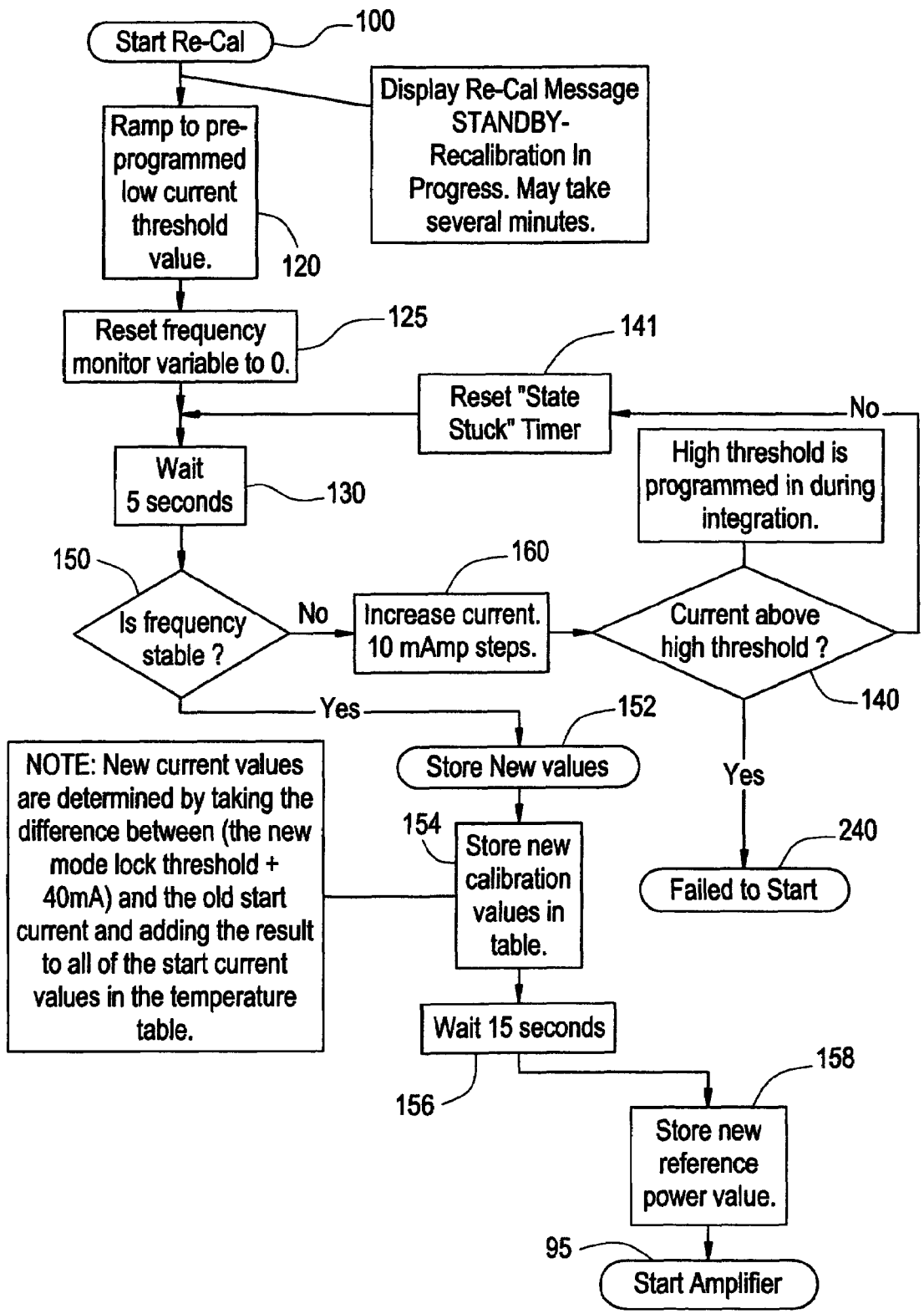
FIG. 3 illustrates a recalibration procedure; and the use and storage of offset values derived from recalibration and mode lock search.

Referring still to FIG. 1, if the controller is unable to detect a stable frequency upon setting the initial pump diode current for the oscillator, the pump diode current is set to zero at step 72 and a recalibration procedure, "Start Re-Cal" 100, is initiated as shown in FIG. 3. A message is displayed that informs the user that the recalibration process is taking place. The controller then ramps the oscillator pump diode current to a preset low value at step 120 to begin the recalibration procedure. The variable stored in the controller representing actual frequency is reset at step 125, and after a brief delay 130, a check of the oscillator frequency is then performed to see if a stable frequency has been achieved. If it has, current values for the present temperature are stored at step 152, and at step 154, other start current values (for other temperatures) are recalibrated and re-stored as described in FIG. 3, and a new reference power value is determined and set at 158 after a short wait 156.

If a stable frequency has not been achieved, the current is increased in discrete steps, at step 160, in one embodiment that step size being ten milliamperes, until a stable frequency is achieved. Again, an upper limit on the oscillator pump diode current is set at step 140 to prevent damage to the system (an optional reset step 141 is inserted as a guard against processor failure during the current increase process). This upper limit is adjustable, in one particular embodiment the upper limit is set as two hundred milliamperes above the preset initial recalibration current setting. If the current limit is reached without achieving a stable frequency, another adjustment procedure is initiated, indicated in the flow chart by the "Failed to Start" procedure 240.

Figure 4:
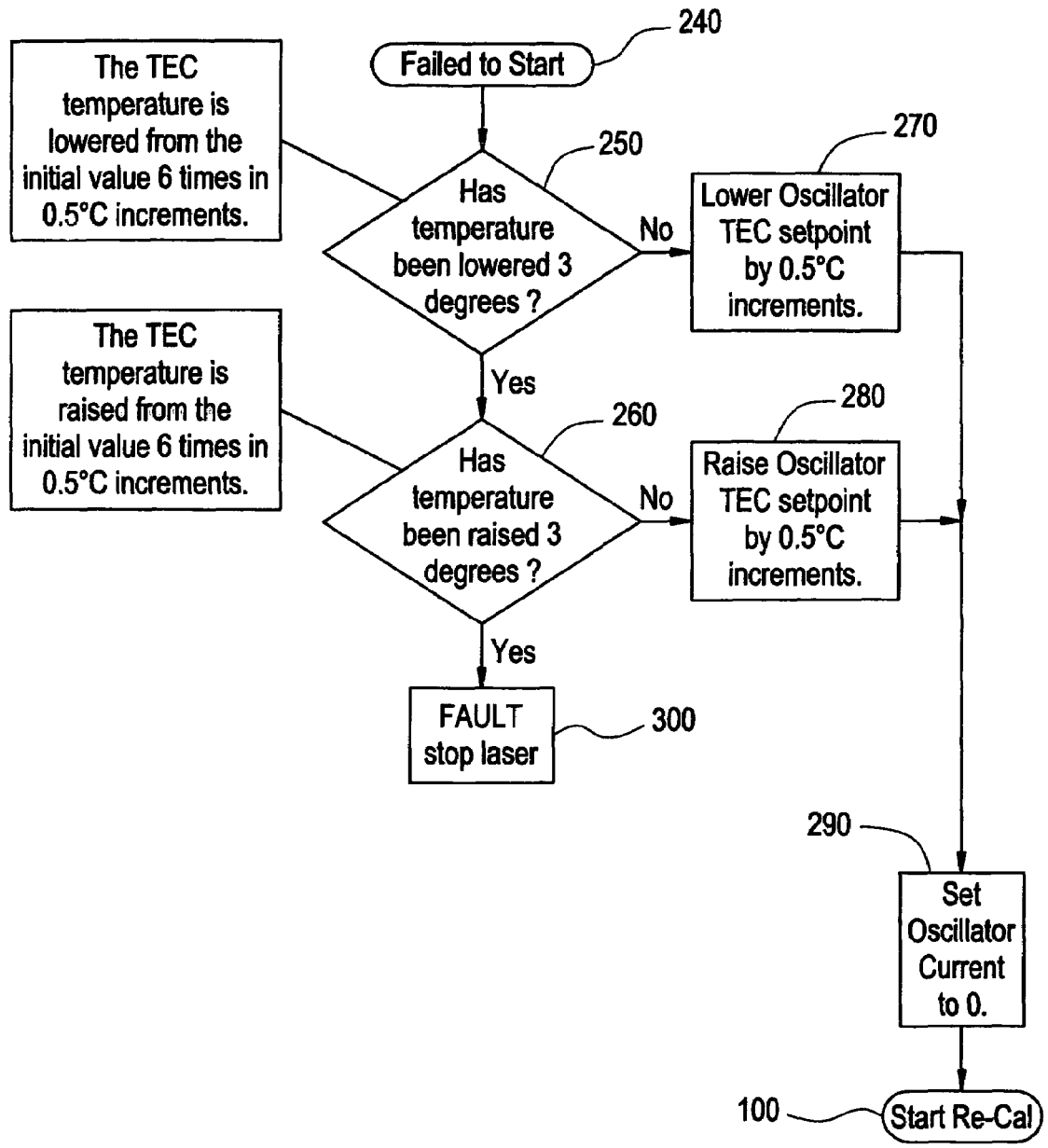
FIG. 4 shows a diode temperature adjustment procedure as a part of a mode lock search algorithm.

In the "Failed to Start" procedure shown in FIG. 4, the temperature of the oscillator pump diode is adjusted. In one particular embodiment this is done by changing the set point of a thermoelectric cooler (TEC) controlling the pump diode temperature. This is done to change the pump diode wavelength to a more optimum wavelength for mode-locking the oscillator. In one particular embodiment the oscillator pump diode temperature is adjusted in 0.5 degree C. increments, and the recalibration procedure, "Start Re-Cal", which varies the oscillator pump diode current and checks the oscillator frequency, is performed again. The number of adjustments and the step size per adjustment is programmable. In one particular embodiment, the temperature is lowered by 0.5 degrees C. per step in six stages as shown by steps 250, 270, and at each stage the recalibration procedure is run again (steps 290, 100 and FIG. 3). If successful start up or re-start is not obtained, the temperature is then raised from the initial value by 0.5 degrees C. per step in six stages as shown by steps 260, 280, in the same manner. If a stable frequency cannot be obtained after adjusting the temperature of the oscillator pump diode, a fault is indicated and laser operation is halted at step 300.

When successful startup is obtained using the procedure of FIG. 4, the "store new values" procedures (FIG. 3) use the information obtained in both the "Start Re-Cal" and "Failed to Start" procedures to establish a new starting current and pump diode temperature for the oscillator pump diode. The difference between the original oscillator pump diode current and the new oscillator pump diode current is calculated and this offset is added to each of the values of oscillator pump diode current stored in the controller's non-volatile memory as a function of temperature. In addition, the new set temperature for the oscillator pump diode thermoelectric cooler is also stored in the controller's non-volatile memory in this step.

The invention also contemplates similar control over the operation of the amplifier, and adjustment of oscillator wavelength to maintain optimum matching of this wavelength with the absorption profile of the amplifier gain media, which may change over time and with temperature. Details of amplifier control and feedback in this manner are described in the aforementioned U.S. application Ser. No. 10/813,173 of the same assignee, which is incorporated herein by reference.

What is claimed is:

1. Control apparatus for a fiber laser system including an oscillator and an amplifier, comprising:
   detecting elements for monitoring laser parameters including pump diode temperature and current or power, and an output power and repetition rate of a fiber laser oscillator; and
   a controller receiving inputs from said detecting elements, and controlling said monitored parameters in order to initiate and maintain mode-locked operation of said fiber laser oscillator.

2. Apparatus as claimed in claim 1, including a photodiode and an amplifier for monitoring said repetition rate, and wherein said controller is configured to determine whether said repetition rate is stable.

3. Apparatus as claimed in claim 1, wherein said controller includes a parameter memory which stores initial values for said pump diode current or power as a function of oscillator temperature, and a reference value for said oscillator power output, and operates to ramp up said diode current to an initial value.

4. Apparatus as claimed in claim 3, wherein, upon said controller determining that said repetition rate is stable, indicating mode-locking, said output power measuring element determines said output power, and said controller increases a current of said pump diode if said measured output power is below said reference value.

5. Apparatus as claimed in claim 4, wherein an amount of said increase in pump current is dependent upon the magnitude of the difference between said measured output power and said reference value.

6. Apparatus as claimed in claim 3, wherein, upon said controller determining that said repetition rate is stable, indicating mode-locking, said output power measuring element determines said output power, and said controller decreases a current of said pump diode if said measured output power is above said reference value.

7. Apparatus as claimed in claim 6, wherein an amount of said decrease in pump current is dependent upon the magnitude of the difference between said measured output power and said reference value.

8. Apparatus as claimed in claim 3, wherein, upon said controller determining that said repetition rate is not stable after a predetermined period of time, said controller sets diode current to zero and initiates a recalibration procedure.

9. Apparatus as claimed in claim 8, wherein said recalibration procedure comprises ramping up said diode current to a low threshold value stored by said controller, determining whether said repetition rate is stable, and if said repetition rate is not stable, increasing and decreasing said diode current in a stepwise manner until a stable repetition rate is achieved.

10. Apparatus as claimed in claim 9, wherein, if said recalibration procedure fails to achieve a stable repetition rate, said controller initiates a procedure including increasing and decreasing said diode temperature in a stepwise manner, and reinitiating said recalibration procedure, until a stable repetition rate is achieved.

11. Method of controlling a fiber laser system including an oscillator and an amplifier, comprising:
   monitoring laser parameters including pump diode temperature and current or power, and an output power and repetition rate of a fiber laser oscillator;
   controlling said monitored parameters in order to initiate and maintain mode-locked operation of said fiber laser oscillator.

12. Method as claimed in claim 11, including monitoring said repetition rate, and stability of said repetition rate.

13. Method as claimed in claim 11, further including storing initial values for said pump diode current as a function of oscillator temperature, and a reference value for said oscillator power output, and wherein said controlling step includes ramping up said diode current to an initial value.

14. Method as claimed in claim 12, wherein, upon determining that said repetition rate is stable, indicating mode-locking, measuring said output power, and increasing a current of said pump diode if said measured output power is below said reference value.

15. Method as claimed in claim 14, wherein an amount of said increase in pump current is dependent upon the magnitude of the difference between said measured output power and said reference value.

16. Method as claimed in claim 12, wherein, upon determining that said repetition rate is stable, indicating mode-locking, measuring said output power, and decreasing a current of said pump diode if said measured output power is above said reference value.

17. Method as claimed in claim 16, wherein an amount of said decrease in pump current is dependent upon the magnitude of the difference between said measured output power and said reference value.

18. Method as claimed in claim 12, wherein, upon said controller determining that said repetition rate is not stable after a predetermined period of time, setting diode current to zero and initiating a recalibration procedure.

19. Method as claimed in claim 18, wherein said recalibration procedure comprises ramping up said diode current to a low threshold value stored by said controller, determining whether said repetition rate is stable, and if said repetition rate is not stable, increasing and decreasing said diode current in a stepwise manner until a stable repetition rate is achieved.

20. Method as claimed in claim 19, wherein, if said recalibration procedure fails to achieve a stable repetition rate, initiating a procedure including increasing and decreasing said diode temperature in a stepwise manner, and reinitiating said recalibration procedure, until a stable repetition rate is achieved.

21. Fault-recovery method for automatically re-establishing mode-locking in a fiber laser system including a fiber oscillator including a pump diode, comprising;

ramping said diode current to a low threshold value below a normal operating current, determining whether a repetition rate of said oscillator is stable, and if said repetition rate is not stable, recalibrating by increasing and decreasing said diode current in a stepwise manner until a stable repetition rate is achieved, wherein, if said recalibration fails to achieve a stable repetition rate, initiating a procedure including increasing and decreasing said diode temperature in a stepwise manner, and reinitiating said recalibration procedure, until a stable repetition rate is achieved.

* * * * *